(12) United States Patent  
Baker et al.

(10) Patent No.: US 8,838,432 B2  
(45) Date of Patent: Sep. 16, 2014

(54) IMAGE ANNOTATIONS ON WEB PAGES

(75) Inventors: Simon John Baker, Palo Alto, CA (US); Juliet Anne Bernstein, Seattle, WA (US); Krishnan Ramnath, Redmond, WA (US); Anitha Kannan, Mountain View, CA (US); Dahua Lin, Cambridge, MA (US); Qifa Ke, Cupertino, CA (US); Matthew Uyttendaele, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 13/366,385

(22) Filed: Feb. 6, 2012

(65) Prior Publication Data

US 2013/0204608 A1   Aug. 8, 2013

(51) Int. Cl.
*G06F 17/20* (2006.01)
*G06F 17/27* (2006.01)
*G06F 17/21* (2006.01)

(52) U.S. Cl.
USPC ..................................... 704/1; 704/9; 704/10

(58) Field of Classification Search
USPC ............................ 704/1, 9, 10; 707/705–788; 709/201–203; 719/311–317
See application file for complete search history.

(56) References Cited

U.S. PATENT DOCUMENTS

| | | | |
|---|---|---|---|
| 7,035,461 B2 * | 4/2006 | Luo et al. ..................... | 382/167 |
| 7,254,285 B1 * | 8/2007 | Paek et al. ................... | 382/305 |
| 7,657,507 B2 | 2/2010 | Shi et al. | |
| 7,913,185 B1 | 3/2011 | Benson et al. | |
| 2006/0041564 A1 * | 2/2006 | Jain et al. .................... | 707/100 |
| 2006/0239515 A1 * | 10/2006 | Zhang et al. ................ | 382/118 |
| 2007/0236583 A1 * | 10/2007 | Vuong et al. ............ | 348/231.99 |
| 2008/0021928 A1 * | 1/2008 | Yagnik ....................... | 707/104.1 |
| 2008/0115055 A1 * | 5/2008 | Sadovsky et al. ........... | 715/255 |
| 2009/0125544 A1 * | 5/2009 | Brindley ..................... | 707/102 |

OTHER PUBLICATIONS

"TinEye", Retrieved at <<http://www.tineye.com/imageurl>>, Retrieved Date: Oct. 19, 2011, pp. 3.

Yan, et al., "An Efficient Manual Image Annotation Approach based on Tagging and Browsing", Retrieved at <<http://www.wjh.harvard.edu/~mahesh/image%20search%20and%20annotation/p13-yan.pdf>>, Proceedings of Workshop on multimedia information retrieval on the many faces of multimedia semantics, Sep. 28, 2007, pp. 13-20.

(Continued)

*Primary Examiner* — Jesse Pullias
(74) *Attorney, Agent, or Firm* — Steve Wight; Carole Boelitz; Micky Minhas

(57) ABSTRACT

An image in a web page may be annotated after deriving information about an image when the image may be displayed on multiple web pages. The web pages that show the image may be analyzed in light of each other to determine metadata about the image, then various additional content may be added to the image. The additional content may be hyperlinks to other webpages. The additional content may be displayed as annotations on top of the images and in other manners. Many embodiments may perform searching, analysis, and classification of images prior to the web page being served.

20 Claims, 4 Drawing Sheets

(56) References Cited

OTHER PUBLICATIONS

Babu, Ganesh, "Search Using an Image with Google Image Search", Retrieved at <<http://www.axleration.com/search-using-an-image-with-google-image-search/#comments>>, Retrieved Date: Oct. 19, 2011, pp. 4.

"Make popup text on Instructable images", Retrieved at <<http://www.instructables.com/id/Make-popup-text-on-Instructable-images/>>, Retrieved Date: Oct. 20, 2011, pp. 3.

Li, et al., "Composing Simple Image Descriptions using Web-scale N-grams", Retrieved at <<http://acberg.com/papers/ngram_desc.pdf>>, Retrieved Date: Oct. 20, 2011, pp. 9.

Yavlinsky, et al., "A large scale system for searching and browsing images from the World Wide Web", Retrieved at <<http://citeseerx.ist.psu.edu/viewdoc/download?doi=10.1.1.126.1377&rep=rep1&type=pdf>>, Retrieved Date: Oct. 20, 2011, pp. 9.

Wang, et al. "ARISTA—Image Search to Annotation on Billions of Web Photos", Retrieved at <<http://research.microsoft.com/en-us/people/xjwang/cvpr10_paper301_arista_final.pdf>>, Jun. 2010, pp. 8.

Baker, et al., "Matching Text to Images" U.S. Appl. No. 12/979,375, filed Dec. 28, 2010, pp. 21.

* cited by examiner

IMAGE ANNOTATIONS ON WEB PAGES

BACKGROUND

Information about images on a website may be difficult to determine, especially when an image may be presented with merely a caption or name. Because the images may not have much associated information, images may not offer much opportunity for enhancements.

SUMMARY

An image in a web page may be annotated after deriving information about an image when the image may be displayed on multiple web pages. The web pages that show the image may be analyzed in light of each other to determine metadata about the image, then various additional content may be added to the image. The additional content may be hyperlinks to other webpages. The additional content may be displayed as annotations on top of the images and in other manners. Many embodiments may perform searching, analysis, and classification of images prior to the web page being served.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
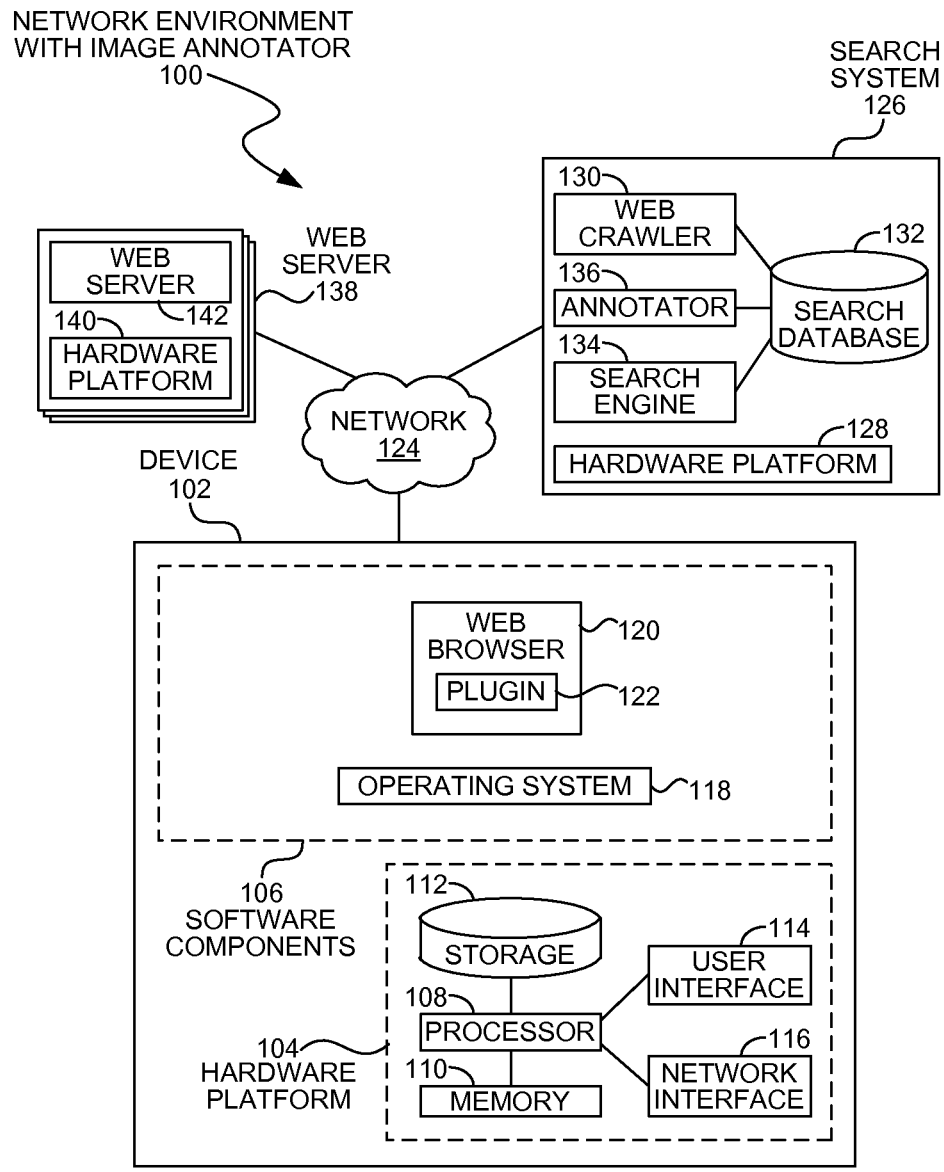
FIG. 1 is a diagram illustration of an embodiment showing a system for adding annotations to web pages.

An image on a web page may be annotated or enhanced by adding text or other information to the image. The annotations may be derived from searching other web pages or websites that contain the same or similar image. The annotations may or may not be created or managed by the website providing the page to be displayed.

A search system may gather information about an image by searching multiple websites that display the same image or a similar image. Based on information derived from the multiple websites, annotations may be created and placed on top of the image when the image is displayed in a web browser. The annotations may be in the form of hot spots, windows, or any other type of annotations that may be placed on or near an image.

In one example, an image of a vehicle may be shown in a website. In the example, the website may be a user's social network posting showing their new vehicle. A search system may search to find several other websites that contain the same or similar image. One of the other websites may be a vehicle dealer that offers the vehicle for sale.

In the example, the browser that displays the user's social network website may identify the vehicle image as being the same or similar to the dealer's website. The browser may display the user's social network webpage and may create an annotation that links to the vehicle dealer's website. The annotation may be a hotspot placed over the image or a portion of the image. A user may then interact with the annotation to be taken to the dealer's website or to have information displayed from the dealer's website.

In another example, a website may display an image associated with a news event, such as a scene from a political rally. Annotations for the image may be gathered from many different news sources, including background information on a political leader featured at the political rally, as well as weblog postings or social network feeds associated with the rally.

In the example, a search system may search for many different websites that contained the same image. Further, the search system may also identify the political leader in the image and perform a search for the leader, as well as identify several landmarks in the background. The search system may perform additional searches on the political leader as well as the location of the landmarks.

In the second example, the website may be annotated with multiple hotspots. As an example, a hotspot may be created over the political leader's face with links to background information on the leader as well as the leader's current social network feed. Another hotspot may be placed over a landmark in the image and provide additional information about the landmark.

In the example, the hotspots may be presented in several different manners. In one manner, the hotspots may be hidden from view but may be activated or illuminated when a user passes a mouse or pointer over the image or selects a button to illuminate the hotspots. Such an action may be known as a mouseover action. In another manner, the hotspots may be windows with text, links, images, or other content that hover over the image or specific areas in the image. Other embodiments may display the annotations in still other manners.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may annotate images in a web page. Embodiment 100 is a simplified example of a network environment in which a web browser may display a web page, but gather annotations from a search system to place on top of the image.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a network environment in which images within a web page may be annotated with links, information, or other objects. A web page's images may be sent to a search system that may find additional information about the image, then create annotations for the image so that a web browser may display the annotations for the user to view.

The annotations may come from a different source than the web page and may include information that is not known or intended to be displayed by the owners and designers of the web page. In many cases, the annotations may be provided by a third party that is independent from the owners of the web page.

The web page may be downloaded from a web server. In many cases, a single web page may be assembled from links that retrieve images or other content from various sources, which may be other web servers. As the web page is being downloaded or after the download is complete, the entire web page may be rendered for a user to view.

Images within the web page may be transmitted to a search system that may create annotations for the image. The search system may identify the image by analyzing other web pages that contain the same image, and may create various annotations based in information gathered from other web pages that contain that image.

The annotations may include links to other web pages that contain the same image or content related to the image. In some cases, text or other displayable objects may be gathered from the other web pages and an annotation may be created.

In some embodiments, the annotations may be rendered as invisible hot spots that are rendered on top of the annotated image. A user may be able to discover the hot spots by moving a cursor or pointing device over the image. When the invisible hot spot may be discovered, the hot spot may be identified with an outline of the hot spot while the user hovers over the hot spot. In some embodiments, the annotation may include text, images, paid advertisements, or other objects that may be displayed in a window or other mechanism on top of the web page. The user may be presented with a link to another website in the window, or the user may click the hot spot to follow a link.

In some embodiments, the annotations may be rendered as text, graphics, or other objects that are placed on top of the image. In some cases, the annotations may be rendered as partially translucent objects that allow the user to see both the annotations and the image underneath.

The device 102 is illustrated having hardware components 104 and software components 106. The device 102 as illustrated represents a conventional computing device, although other embodiments may have different configurations, architectures, or components.

In many embodiments, the device 102 may be a server computer. In some embodiments, the device 102 may still also be a desktop computer, laptop computer, netbook computer, tablet or slate computer, wireless handset, cellular telephone, game console or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

A web browser 120 may operate within the operating system 118 to retrieve and display web pages. In some embodiments, a plugin 122 may perform the functions of finding annotations for images in a web page, and the web browser 120 may render those annotations with the images. Some embodiments may incorporate the features of the plugin 122 into the web browser 120.

When the web browser 120 retrieves a web page, the web browser 120 may communicate with one or more web servers 138 over a network 124. A web server 138 may operate on a hardware platform 140 to execute a web server application 142. In a typical communication sequence, a web browser 120 may contact the web server application 142 and request a web page. The web server application 142 may transmit a web page to the web browser 120, and the web browser 120 may render the web page on a display.

The plugin 122 may identify images contained within the web page and may send those images or identifiers for those images to a search system 126.

The search system 126 may attempt to find additional information about the images so that annotations may be created. The search system 126 may operate on a hardware platform 128 and may have a web crawler 130 that may attempt to locate images and other information contained in various web pages. The web crawler 130 may populate a search database 132. In some embodiments, the web crawler 130 may also populate other databases.

When a request for annotations are received, a search engine 134 may attempt to find web pages that contain the same or similar images as in the web page being rendered by the web browser 120. An annotator 136 may gather metadata and other information from the other web pages and may create annotations for the image. The annotator 136 may transmit the annotations to the plugin 122, which may cause the web browser 120 to render the annotations along with the original web page.

The example of annotating a web page is a simplified example of the annotation mechanism. In some embodiments, the annotation mechanism may be used to annotate any type of image that may be displayed on the device 102, which may include any image displayed by any type of application, the operating system, or other software operating on the device 102. Different types of applications may be used to render the image and annotations. In some cases, the image may be stored locally on the device 102 in some cases, as opposed to being downloaded from another server.

Figure 2:
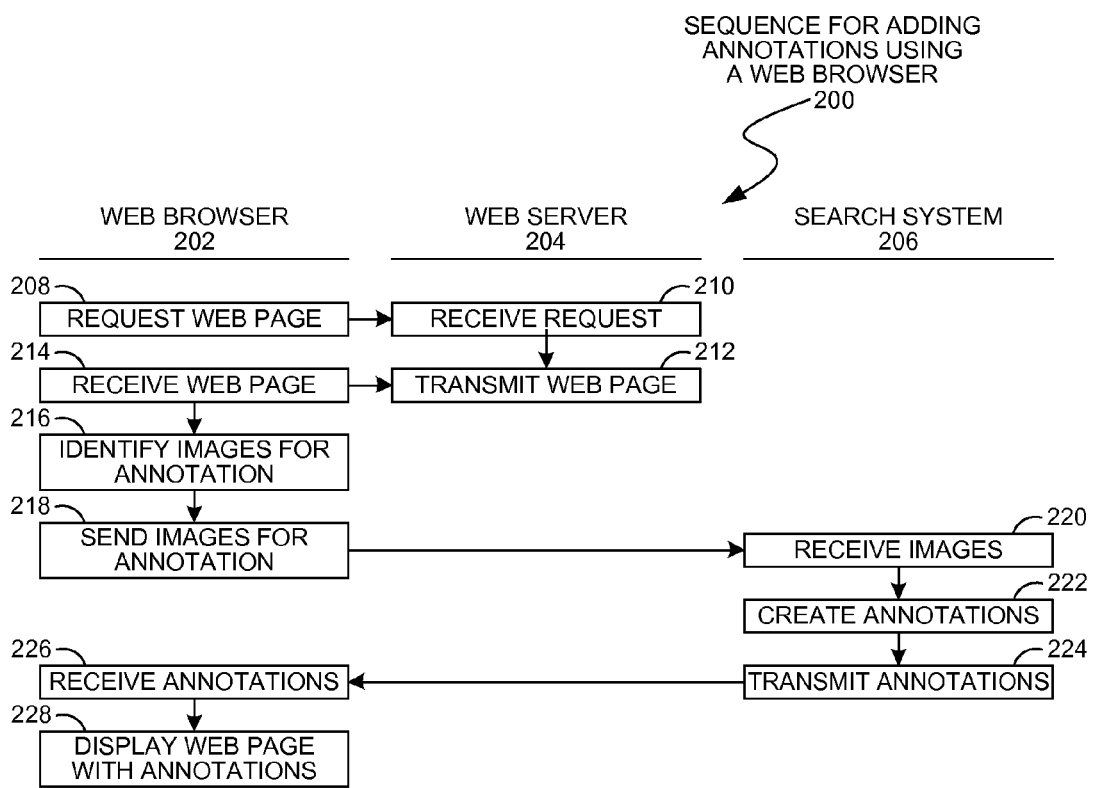
FIG. 2 is a flowchart illustration of an embodiment showing a method for adding annotations using a web browser.

FIG. 2 is a flowchart illustration of an embodiment 200 showing a sequence for adding annotations using a web browser. The process of embodiment 200 is a simplified example of one method that may be performed by a web browser 202, web server 204, and search system 206. The operations of the web browser 202 are illustrated in the left hand column, the operations of the web server 204 are illustrated in the center column, and the operations of the search system 206 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method whereby a web browser or web browser plugin may cause images from a particular website to be annotated by a search system. Embodiment 200 shows a method that adds annotations to a web page, where the annotations are provided separately from the web page. In such an embodiment, the designers and owners of the web page may not have any control over what annotations are placed on their images.

The method of embodiment 200 allows a secondary source to add information to a third party's web page. In some instances, the secondary source may be an advertising engine that adds advertisements to any web page or image viewed by a user.

The web browser 202 may request a web page in block 208 from the web server 204. The web server 204 may receive the request in block 210 and transmit the web page in block 212, which may be received by the web browser 202 in block 214. In many cases, a single web page may be retrieved from multiple sources. For example, a single web page may include images or other content that are retrieved and downloaded from other web servers.

The web browser 202 may identify images that may be annotated in block 216. In some embodiments, the web browser 202 may select a subset of all the images in a web page. Some web pages may contain tens or even hundreds of individual images, which may be icons or other graphical elements. Such images may or may not be suitable for annotations, while other images, such as an image associated with a news story, may be more suitable.

In some embodiments, certain images within a web page may be tagged or identified as being the preferred images for annotation. In such embodiments, the web page designer may designate a specific image or set of images for annotation.

The images may be sent to the search system 206 in block 218 and may be received in block 220. In some embodiments, the actual images may not be sent to the search system 206. In such embodiments, identifiers for the image or metadata may be transmitted. Examples may include hashed identifiers for an image, Universal Resource Identifiers (URI) for an image, metadata that describes or identifies the image, or other identifiers.

The search system 206 may create the annotations in block 222, then transmit the annotations in block 224. The web browser 202 may receive the annotations in block 226 and may display the web page with the annotations in block 228.

Figure 3:
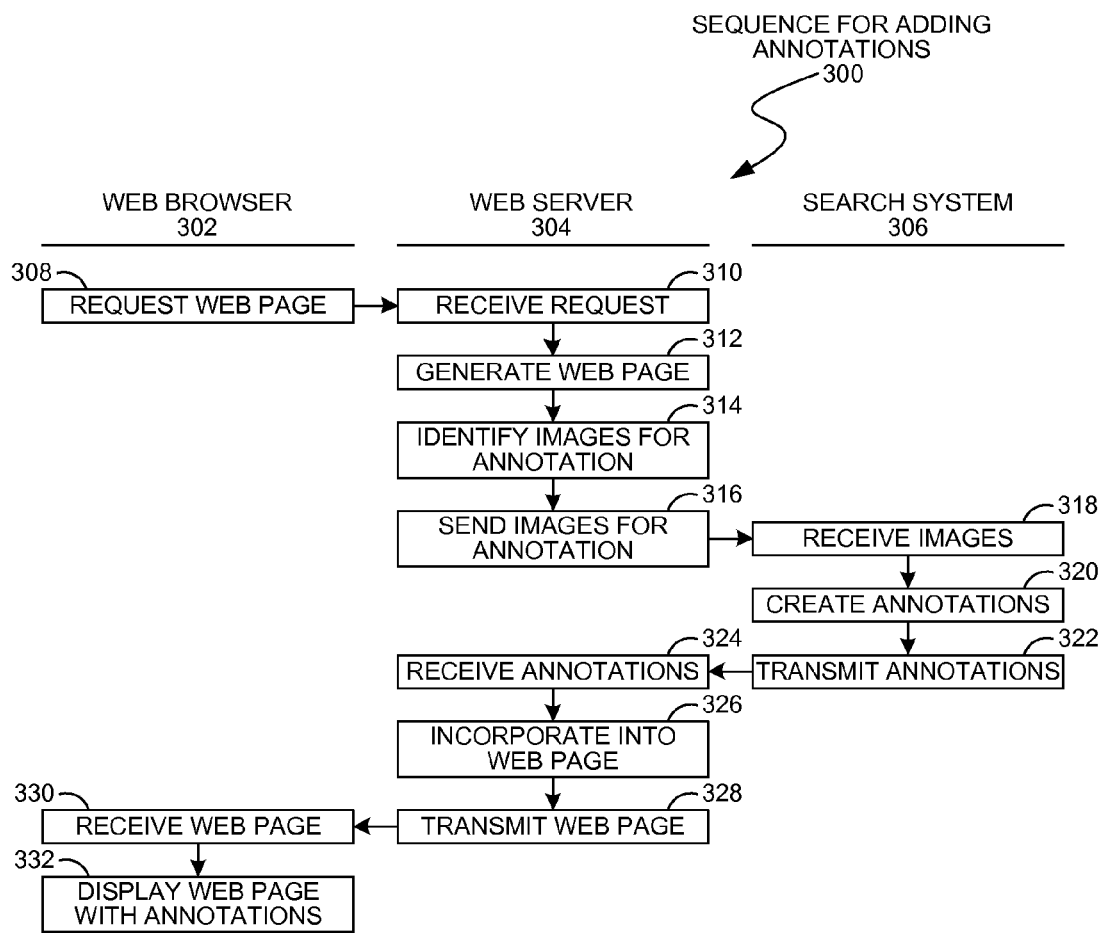
FIG. 3 is a flowchart illustration of an embodiment showing a method for adding annotations using a web server.

FIG. 3 is a flowchart illustration of an embodiment 300 showing a sequence for adding annotations to a web page. The process of embodiment 300 is a simplified example of one method that may be performed by a web browser 302, web server 304, and search system 306. The operations of the web browser 302 are illustrated in the left hand column, the operations of the web server 304 are illustrated in the center column, and the operations of the search system 306 are illustrated in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method whereby a web server may request annotations from a search system. The web server may gather annotations from the search system to annotate a web page prior to sending the web page to a web browser.

Embodiment 300 differs from embodiment 200 in that the web server that is generating the web page also requests the annotations for its images. In embodiment 200, the web page provider may have no knowledge or control over the annotations shown on their web page, but in embodiment 300, the web page provider may have full control over the annotations.

In block 308, the web browser 302 may request a web page. The request may be received by the web server 304 in block 310. The web page may be generated in block 312.

The web server 304 may identify images for annotation in block 314 and may sent the images to the search system 306 in block 316. In some embodiments, the images for annotation may be identified by the creator of the web page. Some such embodiments may use HTML tags or other identifiers within a web page definition to identify those images that may be annotated.

The search system 306 may receive the images in block 318, create the annotations in block 320, and transmit the annotations in block 322.

Some embodiments may transmit the actual images from the web server 302 to the search system 306 in block 316, while other embodiments may transmit metadata about the images. The metadata may include titles, descriptions, links to the image, hashed identifiers, or other information. The metadata may also include image features that are computed or derived from the image.

The annotations may be received by the web server 302 in block 324 and incorporated into the web page in block 326. The web page may be transmitted in block 328 from the web server 304.

The web page may be received in block 330 by the web browser 302 and displayed in block 332.

Figure 4:
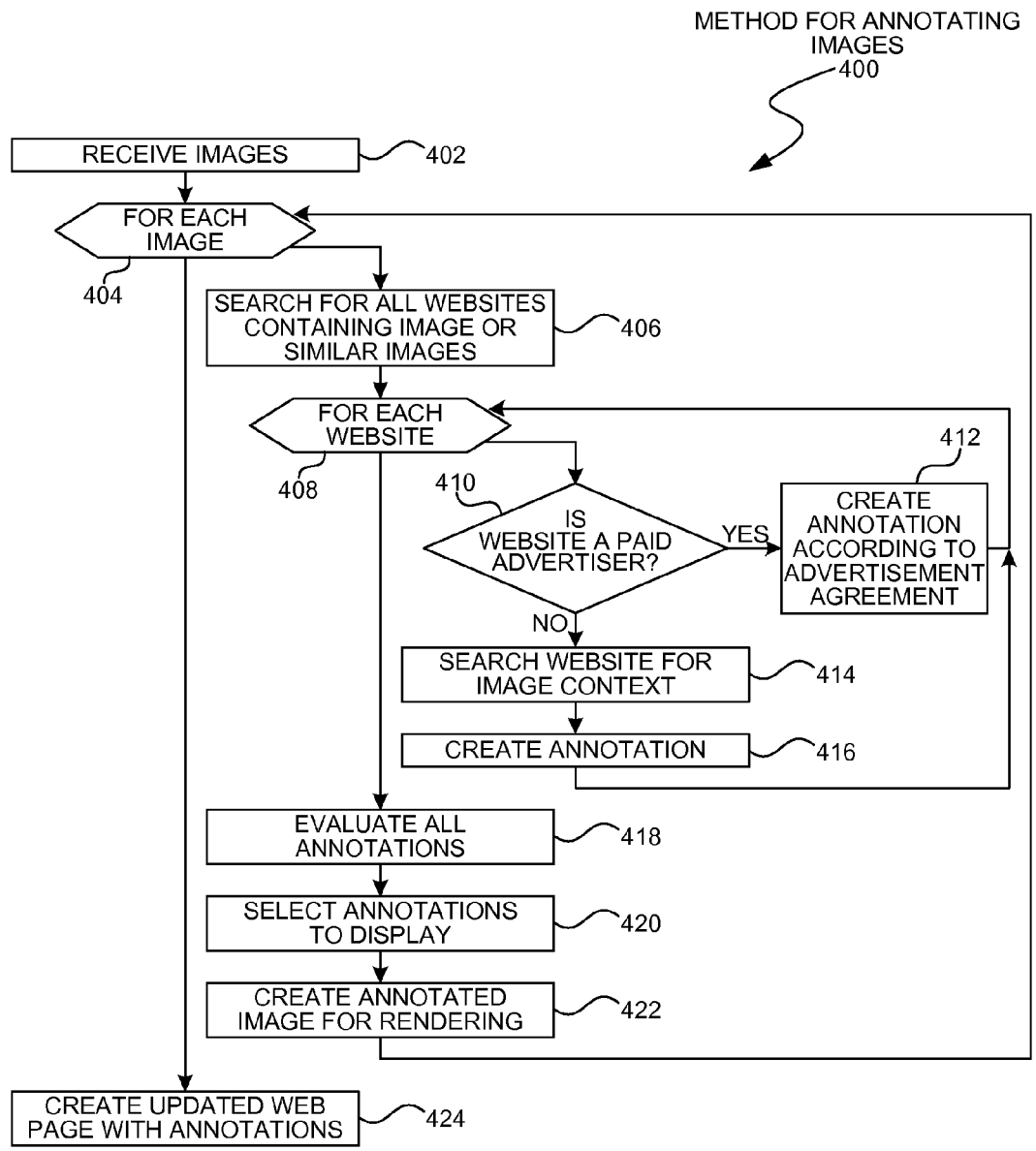
FIG. 4 is a flowchart illustration of an embodiment showing a method for determining annotations for an image.

FIG. 4 is a flowchart illustration of an embodiment 400 showing a sequence for adding annotations to an image. The process of embodiment 400 may be performed by a search system that has an annotator, such as the search system 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates merely one example of a method for identifying annotations for an image. In some cases, the annotations may be advertisements that may be incorporated into the image.

The images to be annotated may be received in block 402. Each image may be processed separately in block 404.

For each image in block 404, a search may be made of all websites that contain the same image or a similar image. In some embodiments, the search may be made ahead of time. Each website may be processed in block 408.

For each website in block 408, if the website is a paid advertiser in block 410, an annotation may be created according to an advertisement agreement in block 412. When an advertising annotation is created, the text, links, images, or other objects for the annotation may be retrieved from the advertiser's website or from some other source. In many embodiments, an advertising annotation may be pre-written and stored in a database for retrieval when an annotation is requested.

If the website is not a paid advertiser in block 410, a search may be made of the website in block 414 to find content relating to the image. In some embodiments, the related content may be determined from links associated with the image, captions, or text that is visually related to the image. Such information may be considered the context of the image with respect to the remainder of the web page. Based on the information extracted from the website, an annotation may be created in block 416.

In many embodiments, the context of an image may be determined from tags or other identifiers that are directly associated with an image. For example, some web pages may use a caption tag that contains a brief description or title of an image. In the example, an annotation for an image on one web page may be taken from the metadata associated with the same or a similar image on a different web site.

The annotation may be text strings, hyperlinks, other images, or other objects retrieved from the web page found in block 406. The annotation may be placed on the image, near the image, or in some other fashion so that a user may link or associate the annotation to the image.

After evaluating all of the websites in block 408, all of the annotations may be evaluated in block 418 and the annotations to display may be selected in block 420. The evaluation of the annotations may take into account whether or not an advertiser paid for the annotation. In some embodiments, the annotations may be selected that have the highest correlation with the image.

An annotated image may be created in block 422, where the annotated image may be ready for rendering by a web browser.

After processing each image in the web page in block 404, an updated web page with annotations may be created in block 424. In some embodiments, the process of block 424 may be performed by a web server, web browser, or plugin for a web browser. In some embodiments, the process of block 424 may be performed by another application, the operating system, or some other executable.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:
   receiving a first image to display on a first web page;
   identifying at least one additional web page comprising a second image related to said first image;
   analyzing each of said web pages to determine a context for said first image;
   from said context, identifying one or more annotations related to said first image;
   evaluating each identified annotation to determine which annotations to display with said first image;

selecting one or more annotations based on the evaluation of the identified annotations;

creating an annotated image for rendering that includes the selected one or more annotations; and displaying an updated first web page with the annotated image.

2. The method of claim 1, said image to display being performed by a web browser.

3. The method of claim 2, said selected annotation being displayed by said web browser with a hyperlink.

4. The method of claim 3, said selected annotation being displayed as a hot spot on said image.

5. The method of claim 4, said analyzing being performed prior to said receiving an image to display.

6. The method of claim 5, said selected annotation being provided from a source other than said at least one additional web page.

7. The method of claim 1, said context being metadata derived from tags associated with said image.

8. The method of claim 7, said selected annotation being text on said at least one additional web page comprising said image.

9. The method of claim 7, said annotation being text retrieved from a source other than a website comprising said image.

10. The method of claim 1, said second image being the same as said first image.

11. The method of claim 1, said second image comprising an image found in said first image.

12. A system comprising:
a processor;
an application operating on said processor;
said application that:
receives an image to display, said image coming from a first source;
transmits metadata associated with said image to a remote source for annotation;
receives one or more annotations for said image, said annotations based on the metadata associated with said image;
evaluates each annotation to determine which annotations to display with said image;
selects one or more annotations based on the evaluation of the annotations; and
creates an annotated image for rendering that includes the selected one or more annotations.

13. The system of claim 12, said application having a plug in that transmits said metadata.

14. The system of claim 12, said metadata comprising information derived from said image.

15. The system of claim 12, said annotation comprising a link to a second web page comprising said image.

16. The system of claim 15, said annotation being made visible on a mouseover performed on said image.

17. The system of claim 16, said remote source comprising a predefined annotation for said image.

18. A method comprising:
receiving a web page to display, said web page comprising an image;
transmitting said image to a remote source for annotation;
receiving one or more annotations for said image;
evaluating each annotation to determine which annotations to display with said image;
selecting one or more annotations based on the annotation evaluations; and
creating an annotated image for rendering that includes the selected one or more annotations.

19. The method of claim 18, said image being transmitted by transmitting a link to a source for said image.

20. The method of claim 19, said annotation comprising a link to a second web page comprising said image.

* * * * *